Oct. 11, 1938.     O. WITTEL     2,132,716
SLIDE CHANGING DEVICE FOR A PROJECTOR
Filed March 20, 1937
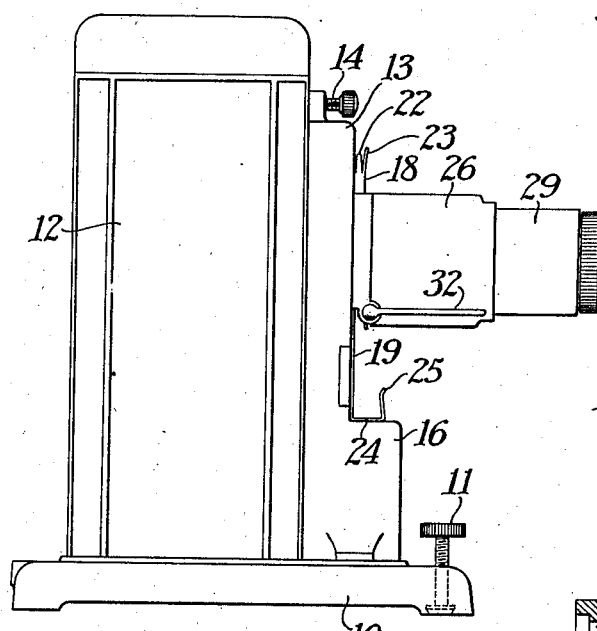
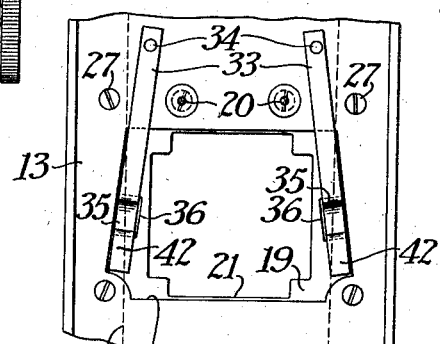
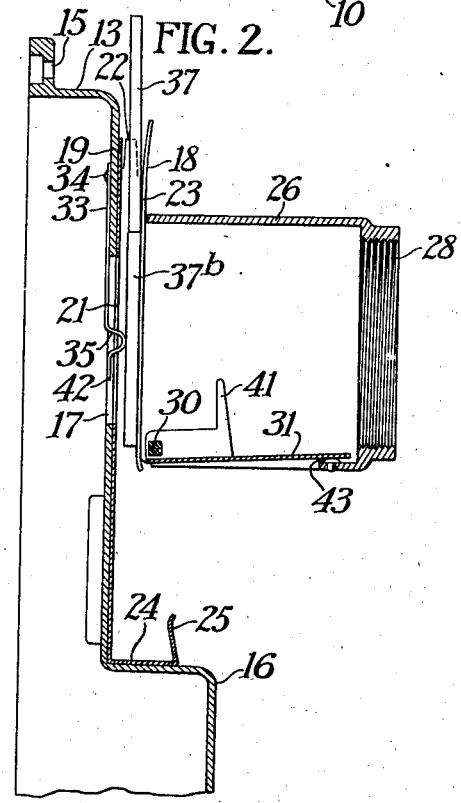
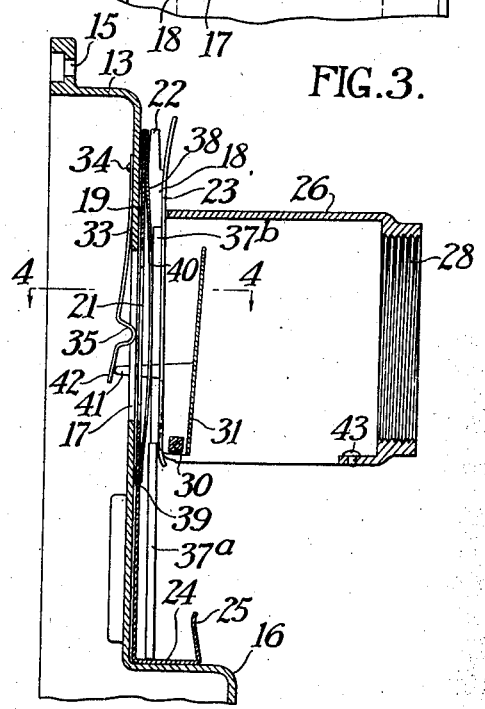
Otto Wittel
INVENTOR.
BY Newton M. Persius
George A. Gillette Jr.
ATTORNEYS Patented Oct. 11, 1938

2,132,716

UNITED STATES PATENT OFFICE 2,132,716

SLIDE CHANGING DEVICE FOR A PROJECTOR

Otto Wittel, Rochester, N. Y., assignor to Eastman Kodak Company, Rochester, N. Y., a corporation of New Jersey Application March 20, 1937, Serial No. 132,107

7 Claims. (Cl. 88—28)

The present invention relates to a slide changing device for a projector in which the projection beam is doused simultaneously with release of the slides for changing.

It is well understood that a more pleasing effect is obtained in the projection of still pictures if the projection beam is intercepted or doused for the change of slides. It is also known that transparent slides may be held in a guideway of a projector by holding means that can be released at will for changing the slides.

The primary object of the present invention is the provision of a projector for transparent slides in which the holding means for the slides at the projection opening is released by movement of the shutter for intercepting the projection beam into closed position.

Another object of the invention is the provision of spring members for holding a transparent slide at a projection opening in a guideway and of projections on a pivotally mounted shutter, which projections engage the spring members for release of the transparent slides when the shutter is moved to intercept the projection beam.

Other and further objects of the invention will be evident to those skilled in the art from the following description.

The above and other objects of the invention are embodied in a projector for transparent slides which is provided with a guideway for the slides, one or more holding members for maintaining a slide at the projection opening of said guideway, a pivotally mounted shutter, and dis-engaging means operative, upon movement of said shutter to closed position, to release said holding means which is maintaining a slide at the projection opening.

Reference is hereby made to the accompanying drawing wherein similar reference characters designate similar elements and wherein:

Fig. 1 is a side elevation of a projector equipped with the novel features of the invention.

Fig. 2 is a vertical cross-section through the projection head of the projector.

Fig. 3 is also a vertical cross-section through the projection head showing the holding means in released position when the shutter is in closed position.

Fig. 4 is a horizontal cross-section taken on the line 4—4 of Fig. 3.

Fig. 5 is a fragmentary rear elevation of the gate structure for the projector.

The invention is particularly applicable to a projector for transparent slides. Such a projector may comprise a base 10 into which one or more leveling screws 11 are threaded. A lamphouse 12 of conventional design and enclosing a light source, not shown, is mounted upon the base 10.

An intermediate mounting frame 13 is fastened to the base 10 and to the lamphouse 12 by a thumbscrew 14 which passes through the opening 15 in the top of mounting frame 13. The intermediate mounting frame 13 has a shoulder 16 and is provided with an opening 17.

A guideway 18 is vertically arranged upon the projector and includes a back plate 19 which is fastened to intermediate mounting frame 13 by bolts 20, see Fig. 5, and which is provided with a projection opening 21. Said guideway 18 has a channel cross-section and comprises side walls 22 and overhanging front edges 23. An abutment 24 is provided at the lower end of guideway 18 upon the shoulder 16 and includes a flange 25.

A shutter housing 26 is fastened to intermediate mounting frame 13 by screws 27 and is recessed at one end to fit over the guideway 18 and at the other end is provided with a threaded opening 28 for the objective 29. A square shaft 30 is journaled in the sides of shutter housing 26 and carries a shutter member 31. An operating arm 32 is connected to one end of shaft 30 and is at one side of shutter housing 26. Rotation of said operating arm 32 rotates said shutter member 31 to cover projection opening 21 in guideway 18 and to intercept the projection beam of the projector.

A holding means is associated with the guideway 18 for engaging and maintaining a transparent slide at the projection opening 21. Such a holding means may comprise a pair of spring members 33 which are fastened within intermediate mounting frame 13 by rivets 34 and which include curved portions 35 extending through the opening 17 in intermediate mounting frame 13 and extending through apertures 36 in the back plate 19 of guideway 18.

The transparent slides 37 may be of any known form, such as lantern slides, or films mounted between transparent sheet members and are adapted to be introduced at the top of guideway 18 and fall by gravity through the guideway. According to the arrangement shown, which in no way restricts the application of the invention, the first slide 37a, see Fig. 3, falls onto the abutment 24 of guideway 18 so that the second slide 37b rests upon slide 37a and is framed at the projection opening 21. Obviously, abutment 24 is so spaced from said projection opening 21 that the lower slide will cause proper framing of the superjacent slide 37b. The slide 37b is engaged and maintained at the projection opening 21 by the holding means, such as by the curved portions 35 extending into guideway 18 and engaging the edges of slide 37b.

The transparent slide 37 may be so thin that if it is not guided through guideway 18 the superjacent slide may not abut the lower slide and may fall directly through the guideway. To obviate this difficulty the holding means may be supplemented by the provision of a curved spring member 38, see Figs. 3 and 4. Said curved spring member 38 may have one end folded over the upper end of back plate 19, the other end folded through an opening 39, see Fig. 3, in back plate 19 and is intermediately convexly bowed toward the overhanging front edges 23 of guideway 18. Curved spring member 38 is also provided with an opening 40 in registry with the projection opening 21 of guideway 18. The engagement of the slides 37 by spring member 38 is sufficient to lightly urge the slides against the overhanging front edges 23 but is not sufficient to prevent the falling of the slides through guideway 18 under the action of gravity. Spring member 38 merely insures that all of the slides will rest against said overhanging edges 23 so that the superjacent slide 37b will always abut the lower slide 37a and be properly framed.

In the modification shown in Fig. 3, the curved portions 35 of spring members 33 bear against the side margins of curved spring member 38, see Fig. 4. Consequently, the slides may be held in position either by direct engagement of curved portions 35 therewith or by said curved portions pressing against the spring member 38 which in turn engages with the slides and maintains them at the projection opening 21.

The outstanding feature of the present invention is a co-operation between the shutter member and the holding means so that as the projection beam is intercepted or doused the holding means is disengaged from the slide at the projection opening. Such co-operation may be effected by the provision of disengaging means movable with the shutter member and for operating the holding means. In the specific illustrated embodiment the disengaging means are provided in the form of projections 41 which are mounted upon the side edges of shutter member 31 or formed integral therewith. Spring members 33 are provided at a slight angle so that the extreme free ends 42 thereof overhang the side walls 22 of guideway 18 and so that projections 41 may pass guideway 18 at each side thereof and strike the ends 42 of spring members 33. Projections 41 are of such length that when shutter member 31 has been moved to closed position, as shown in Fig. 3, said projections 41 have moved the spring members 33 to release the slide at the projection opening. In this manner the slide at the projection opening does not move until the projection beam has been intercepted and the undesirable effect of a moving illuminated slide is eliminated.

The shutter member 31 and operating arm 32 are balanced so that they assume a normal position, as shown in Figs. 1 and 2. In order to eliminate the noise when the shutter member 31 returns to its open position, a rubber bumper 43 is provided within shutter housing 26.

The holding means is illustrated and described as comprising two spring members 33 on the opposite side of the guideway 18 from the shutter member 31, however, it is clear that only one spring member 33 may be sufficient or that the shutter may be arranged on the same side of the guideway as the spring members. Other modifications of the invention may be obvious to those skilled in the art and are deemed to be within the scope of the invention as defined by the appended claims.

Having now particularly described my invention what I desire to secure by Letters Patent of the United States and what I claim is:

1. In a projection apparatus, the combination with a stationary guideway for transparent slides and provided with a projection opening, and holding means movable into said guideway for engaging and maintaining a slide at said projection opening, of a shutter member movably mounted with respect to said projection opening and movable to a closed position for intercepting a projection beam through said opening, and disengaging means movable with said shutter member and for operating said holding means to disengage the slide at said projection opening upon movement of said shutter to closed position.

2. In a projection apparatus, the combination with a vertical and stationary guideway for transparent slides and provided with a projection opening, and holding means extending into said guideway and for engaging and maintaining a slide at said projection opening, of a shutter member movably mounted with respect to said projection opening and movable to a closed position for intercepting a projection beam through said opening, and disengaging means movable with said shutter member and for operating said holding means to disengage the slide at said projection opening upon movement of said shutter member to closed position.

3. In a projection apparatus, the combination with a vertical guideway for transparent slides, provided with a projection opening, and including an abutment at the bottom of said guideway to support a slide and spaced from said opening so as to frame a superjacent slide therein, and holding means having a part within said guideway and for frictionally engaging and maintaining a slide in frame at said projection opening against the action of gravity, of a shutter member movably mounted with respect to said projection opening and movable to a closed position for intercepting a projection beam through said opening, and disengaging means movable with said shutter member and for operating said holding means to disengage the slide at said projection opening upon movement of said shutter member to closed position.

4. In a projection apparatus, the combination with a vertical channeled guideway with overhanging edges, provided with a projection opening, and including an abutment at the bottom of said guideway for supporting a slide and spaced from said opening so as to frame a superjacent slide therein, a curved spring member within said guideway and provided with an opening in registry with said projection opening and for lightly urging said slide against the edges of said guideway, and a holding member extending into said guideway and pressing said spring member against a slide to hold the same at said projection opening, of a shutter member movably mounted with respect to said projection opening and movable to a closed position for intercepting a projection beam through said opening, and a disengaging member movable with said shutter member and for operating said holding means so that the holding pressure on said spring member is released when said shutter member is moved to closed position.

5. In a projection apparatus, the combination with a support having a projection opening, a guideway for slides also provided with a projection opening, and provided with a hole adjacent said opening, and a spring member mounted upon said support and including a curved portion extending through the hole in said guideway and for maintaining a slide at said projection opening, of a shutter member movably mounted with respect to said projection opening and movable to a closed position for intercepting a projection beam through said opening, and disengaging means movable with said shutter member and for operating said spring member to disengage the slide at said projection opening upon movement of said shutter member to closed position.

6. In a projection apparatus, the combination with a support provided with a projection opening, a guideway for lantern slides and provided with a projection opening, and holding means upon said support on one side of said guideway, having a portion extending into said guideway for maintaining a slide at said projection opening, and having a second portion extending beyond the edge of said guideway, of a shutter rotatably mounted at the other side of said guideway and movable to a closed position for intercepting a projection beam, and a projection on said shutter so located that upon movement of said shutter to closed position, the second portion of said holding means is moved and the first portion thereof releases the slide at said projection opening.

7. In a projection apparatus, the combination with a support provided with a projection opening, a vertical channeled guideway with overhanging edges, provided with a projection opening and with a hole on each side thereof, and including an abutment at the bottom of said guideway for supporting a slide and spaced from the opening in said guideway so as to frame a superjacent slide in said opening, a curved plate spring member within said guideway and provided with an opening in registry with said projection opening and for lightly urging the slide against the overhanging edges of said guideway, and a pair of spring members on said support at each side of the opening therein, each having an intermediate curved portion extending into each hole in said guideway normally to press against said plate spring and hold a slide at said projection opening, and each having an end portion extending beyond each edge of said guideway, of a shutter housing attached to said support, a shutter mounted within said housing for rotation about an axis transverse to said guideway, and a projection on each edge of said shutter, located and proportioned to engage the end portions of said spring member when said shutter is moved to cover the projection opening in said guideway and to move said intermediate curved portion away from said plate spring member so that the slide at the projection opening may drop onto said abutment.

OTTO WITTEL.